United States Patent [19]

VanScooter

[11] Patent Number: 4,963,997
[45] Date of Patent: Oct. 16, 1990

[54] FILM MOUNTING MECHANISM FOR IMAGE SCANNER APPARATUS OF THE DRUM TYPE

[75] Inventor: Paul E. VanScooter, Rochester, N.Y.

[73] Assignee: Eastman Kodak Company, Rochester, N.Y.

[21] Appl. No.: 358,212

[22] Filed: May 30, 1989

[51] Int. Cl.⁵ .............................................. H04N 1/04
[52] U.S. Cl. ..................................... 358/493; 358/487
[58] Field of Search ........................ 358/487, 493, 492

[56] References Cited

U.S. PATENT DOCUMENTS

| | | | |
|---|---|---|---|
| 941,046 | 10/1909 | Pugatsky et al. | 24/656 |
| 2,903,510 | 9/1959 | Elliott | 358/492 |
| 4,398,796 | 8/1983 | Akaura et al. | 410/103 |
| 4,440,491 | 4/1984 | Takahama | 358/487 |

Primary Examiner—Edward L. Coles, Sr.
Attorney, Agent, or Firm—Dennis P. Monteith

[57] ABSTRACT

Image scanner apparatus of the drum type includes a hollow, rotatable drum having an aperture on its curved surface corresponding to the size of an image to be scanned, and a light source, disposed inside the drum between its surface of revolution and its axis of rotation, for projecting image-scanning light through the aperture of the drum. A mechanism mounts a flexible image-bearing film immediately adjacent the drum, in a curved plane substantially parallel with the curved surface of the drum and in registration with the aperture on its curved surface, such that a film image to be scanned is free of drum support.

10 Claims, 4 Drawing Sheets

FILM MOUNTING MECHANISM FOR IMAGE SCANNER APPARATUS OF THE DRUM TYPE

CROSS-REFERENCE TO A RELATED APPLICATION

Reference is hereby made to U.S. patent application Ser. No. 241,687 filed on Sept. 8, 1988 in the name of J. Milch and entitled IMAGE SCANNER APPARATUS OF THE DRUM TYPE HAVING AN EFFICIENT LINE-OF-LIGHT ILLUMINATION SYSTEM.

BACKGROUND OF THE INVENTION

1. Field of the Invention

The present invention relates to image scanning apparatus of the drum type. More particularly, the invention relates to a mechanism for mounting an image-bearing film on a drum of the scanner apparatus.

2. Description of the Prior Art

Image scanning is a process of converting an image recorded on a sheet, such as photographic film, to an electronic image. Scanning, as such, is commonly employed as a first step in the transmission of an image from one storage medium to another, or in the enhancement or the analysis of the image prior to its transmission.

With a photographic film held in a given plane, an image scanner measures the optical density of the film by illuminating it with light of known intensity and measuring the amount of light transmitted through, or reflected from, the film. In doing so, the scanner effectively divides the image recorded on the film into discrete picture elements, or pixels, and assigns to each a number or value representing an average density for each pixel. Commonly, the pixels are arranged in rows and columns to form a two-dimensional grid with the density of each pixel corresponding to a relatively small portion of the overall image.

There are various image scanning systems known in the art. Such systems are of two basic types, i.e. so-called planary or flat-bed scanning and so-called cylindrical or drum scanning. With film of a large format, at least greater than the so-called 126-size format, flat-bed scanner apparatus requires a support to maintain the film precisely in a predetermined flat plane. To that end, film is commonly sandwiched tightly between an opposing pair of glass plates. With drum scanner apparatus, a clamping mechanism serves to maintain the film in a curved plane tightly against the surface of the drum. These arrangements, however, suffer from a disadvantage in that the support for the film—glass plates with flat-bed apparatus and the drum with cylindrical apparatus—can create optical interference patterns, known as Newton rings, in the illumination applied to the film.

There are procedures used in the art, with a moderate degree of success, in the eliminating of Newton rings. For example, etched glass, known as anti-Newton glass, can be employed. Such glass, however, is expensive due to its added cost of manufacture. Two other procedures include applying oil to each film sheet, and the use of the so-called "cornstarch method". The former requires that the film support be wiped completely clean of oil each time a different film is to be scanned. Cornstarch works in a hit or miss manner to eliminate Newton rings; thus, that method can be time-consuming in order to obtain fully satisfactory results.

In addition to problems associated with Newton rings, an illumination system of an image scanner should be efficient. It is important, for example from the standpoint of scanning speed, that light not be wasted. That is, light should be directed, to the extent possible, onto only the pixel (or pixels) whose optical density is being measured at that particular time.

The spatial resolution of film determines scene detail—the amount of information—recorded. For example, Ektachrome 64 film, manufactured by Eastman Kodak Company, exposed with an excellent lens can record information to 100 cycles per millimeter (mm). In this case, film pixel pitch should be five microns ($\mu$) to extract all information.

However, information of such minute detail—a few wavelengths of light—imposes stringent requirements on an illumination system. It can be appreciated by those skilled in the image scanner art that it may not be possible, particularly with a high-definition film, to concentrate light solely on pixels of interest, to the total exclusion of other pixels. Nevertheless, light should be directed, to the fullest extent possible, onto only the pixel or pixels whose density is being measured. To some extent, the aforementioned glass plates of flat-bed apparatus and the drum of cylindrical apparatus disperse incident light, thereby contributing to inefficiency.

SUMMARY OF THE INVENTION

In view of the foregoing, it is an object of the present invention to provide a mechanism for mounting an image-bearing photographic film on image scanner apparatus which is free of Newton-ring interference patterns.

Underlying the concept of the present invention is the recognition that bending a sheet of photographic film makes the film more rigid. Film that would normally require support to maintain it in a flat plane need not be supported, when bent, to maintain it in a predetermined curved plane.

With this recognition in mind, image scanner apparatus disclosed in the aforementioned U.S. patent application Ser. No. 241,687 provides for the eliminating of Newton rings. To that end, such image scanner apparatus includes a rotatable hollow drum (or cylinder) having an aperture on its curved surface corresponding to the size of an image to be scanned, and a source of light, disposed inside the drum between its surface of revolution and its axis of rotation, for projecting image-scanning light through the aperture of the drum.

A film-mounting mechanism, in accordance with a preferred embodiment of the invention, couples film to be scanned to the curved surface of the drum, with the image-bearing portion of the film in registration with the aperture of the drum. For that purpose, the mechanism includes a pair of arcuate members each of which has a natural curvature corresponding to the curved surface of the drum and an aperture corresponding to the size of the film image to be scanned. Preferably, the two arcuate members are clamped together magnetically, thereby sandwiching the border of the film (the non-image-bearing portion) therebetween. To that end, one member is made of die-cast aluminum and carries at least one magnetic device, whereas the second member is formed from sheet metal. Mounting screws or the like serve to secure the two arcuate members to the drum.

With the film bent in accordance with the natural curvature of each arcuate member, and thereby the curvature of the drum, its image-carrying portion, although not directly supported, is maintained precisely in a predetermined curved plane parallel with the surface of revolution of the drum. Accordingly, image-scanning light impinges directly onto the film without first having to be transmitted through a film support member. This provides an improved arrangement for the eliminating of undesired Newton rings.

Furthermore, because the film image is unsupported, scanner illumination is not unduly dispersed and, accordingly, is used more efficiently since it is more readily concentrated onto film pixels whose densities are being measured.

These advantages, as well as other advantages of the invention, will become more apparent in the detailed description of the invention presented below.

BRIEF DESCRIPTION OF THE DRAWINGS

The invention will be described with reference to the accompanying drawings, wherein.

DETAILED DESCRIPTION OF A PREFERRED EMBODIMENT

Figure 1:
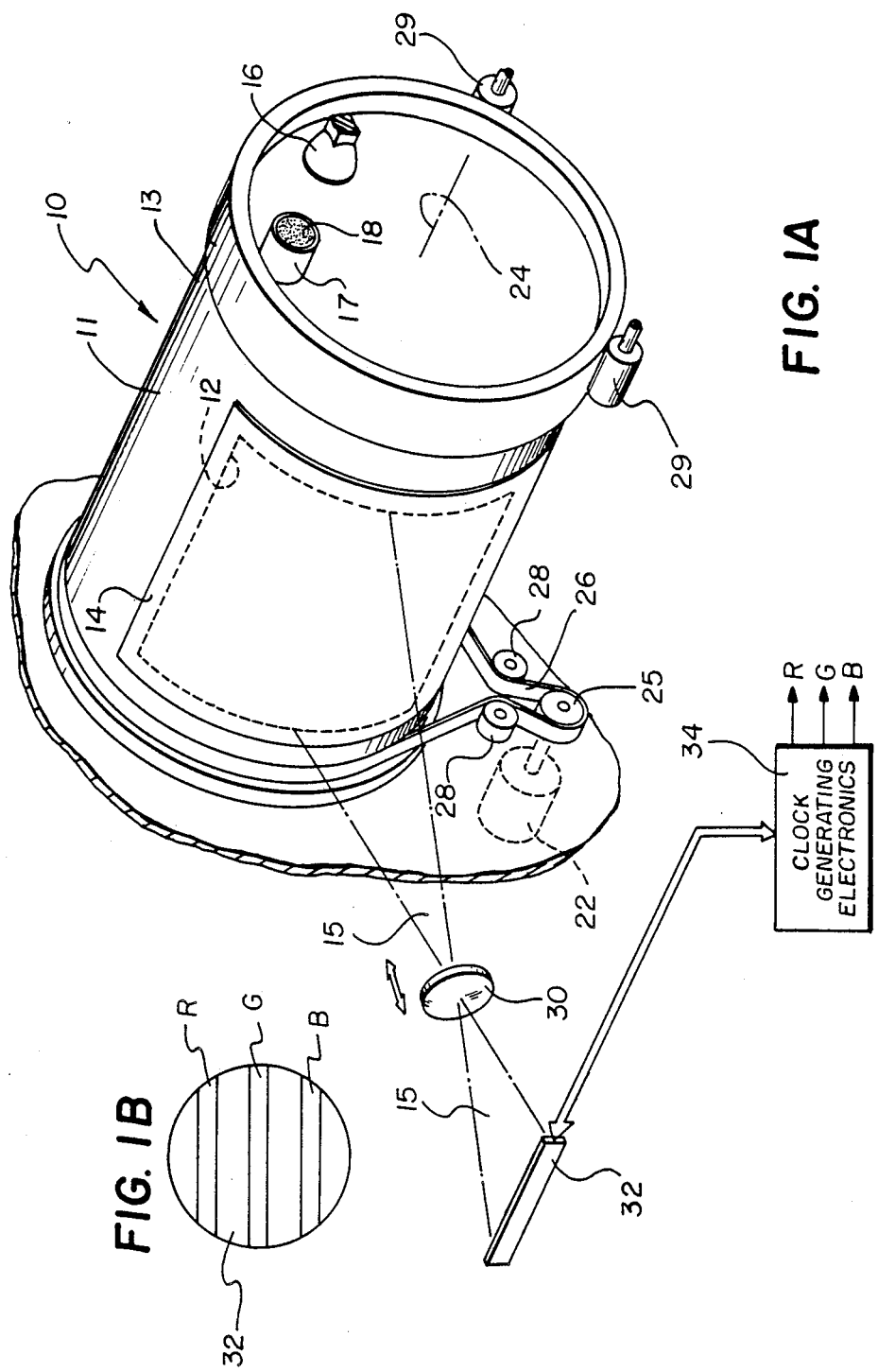
FIG. 1 is a perspective view of image scanner apparatus of the drum type that is free of Newton rings.

An object of the invention is to provide a mechanism for mounting image-bearing film on image scanner apparatus of the drum type that is free of Newton rings. FIG. 1 shows such image scanner apparatus, denoted 10, including a hollow, rotatable drum 11 having an aperture 12 on its curved surface 13 corresponding to the area of an image on a film 14 to be scanned.

Illumination for scanning a film image is provided in the form of a line of illumination, denoted 15. Scanning light illuminates all pixels in a given row of a film image simultaneously to enhance the speed at which an image is scanned. To that end, a lamp 16, preferably of the halogen-tungsten type, provides film-illuminating light.

A fiber optic bundle 17 serves to transform a pencil-shape beam of specular light, provided by the lamp 16, into a flat relatively wide beam, i.e., a beam of generally line-like shape. To that end, the input end of the bundle 17 is aligned with the lamp 16, the diameter of the bundle being substantially equal to the diameter of the specular light beam. The optic fibers, denoted 18, are unbundled inside the drum and arranged with their respective output ends distributed to form the light line 15.

The entire film image is scanned by moving film 14 one row of pixels at a time through the light line 15. To that end, a stepper motor 22 serves to rotate the drum 11 in small increments about a central axis 24. For that purpose, the motor 22 rotates the drum 11 in a line-scan direction—from the top of a film image to the bottom—via a driven pulley 25 and an endless belt 26 wrapped around the drum in an Ω configuration. A pair of idlers 28 functions to control belt tension. Rotatable cam followers 29 serve to locate the drum 11.

Lens apparatus 30 functions to focus an image of one row of film pixels at a time onto a charge coupled device (CCD) linear image sensor 32. An operator sets lens apparatus 30 for a variety of magnifications to control the width of the film image scanned.

The image sensor 32 includes an overlay comprising three parallel arrays of color filters—red (R), green (G) and blue (B). This "tri-linear" image sensor 32 further includes three corresponding parallel output registers which are coupled respectively to an output of one of the color filter arrays. Thus, the output of one of the registers corresponds to a R video signal, a second register to a G video signal, and the third register to a B video signal.

Clock generating electronics 34 function to control the CCD sensor 32 and to process its output signals to produce in a known manner a high-resolution video signal corresponding to the film image. The clock generating electronics 34 applies the R, G and B video signals to circuitry (not shown) for subsequent operations, such as to produce positive R, G and B color signals to provide a composite video signal for display on a video monitor (also not shown).

Figure 2:
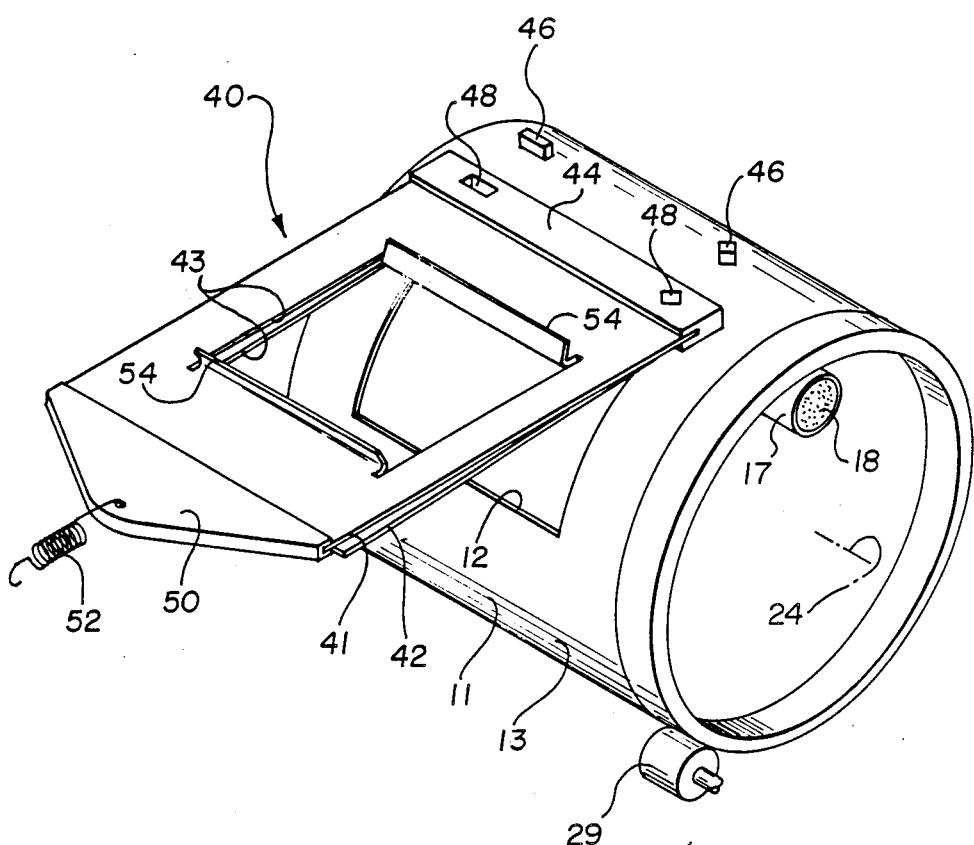
FIG. 2 shows a first embodiment of a mechanism for mounting image-bearing film on the drum of FIG. 1.

FIG. 2 shows a mechanism 40, in accordance with the invention, for mounting film on image scanner apparatus which is free of Newton ring interference patterns. To that end, film to be scanned is bent to the curvature of the surface 13 of the drum 11. Film, when bent, is more rigid than corresponding planar film. The added rigidity of bent film enables the film image of interest to be mounted and held precisely in a curved plane free of drum support.

To that end, film is sandwiched between a pair of flexible rectangular sheets 41, 42. Each sheet has a centrally aligned aperture 43 the dimensions of which correspond to the film image to be scanned. Film to be scanned is somewhat larger than each aperture 43 so that only the border of the film—the non-image-bearing area—is actually sandwiched between the flexible sheets. A molded panel 44 holds the sheets 41, 42 together along a corresponding outer edge to provide a clamshell effect for placing the film between the sheets.

A pair of studs 46, attached to the drum 11 and associated with aperture 12, serves to hold the panel 44 against the curved surface 13 of the drum 11. To that end, each stud 40 is shaped to be received by a correspondingly shaped locating hole 48 in the panel 44.

A spring-loaded lever 50 attached to an edge of the top sheet 41, at the end opposite from the panel 44, serves for holding both sheets 41, 42 tightly against the curved surface 13 of the drum 11. To that end, the free end of a strong spring 52 is attached to a projection (not shown) on the drum 11. In doing so, the spring 52 pulls the lever 50, and thereby wraps sheet 41 directly, and sheet 42, under the influence of sheet 41, around the surface of the drum; with this arrangement, film sandwiched therebetween is bent to the curvature of the drum, with each aperture 43 aligned with the film image, which, in turn is in registration with aperture 12 of the drum 11.

FIG. 2 also shows that the top sheet 41 has a pair of spaced upwardly facing flanges 54 parallel with central axis 24 immediately adjacent opposed edges of the aperture 43. Each flange 54 serves to make the sheet 41 more rigid along the corresponding edge of the aperture 43, and thereby more accurately holds film in a curved plane corresponding to the surface of revolution of the drum.

Figure 3:
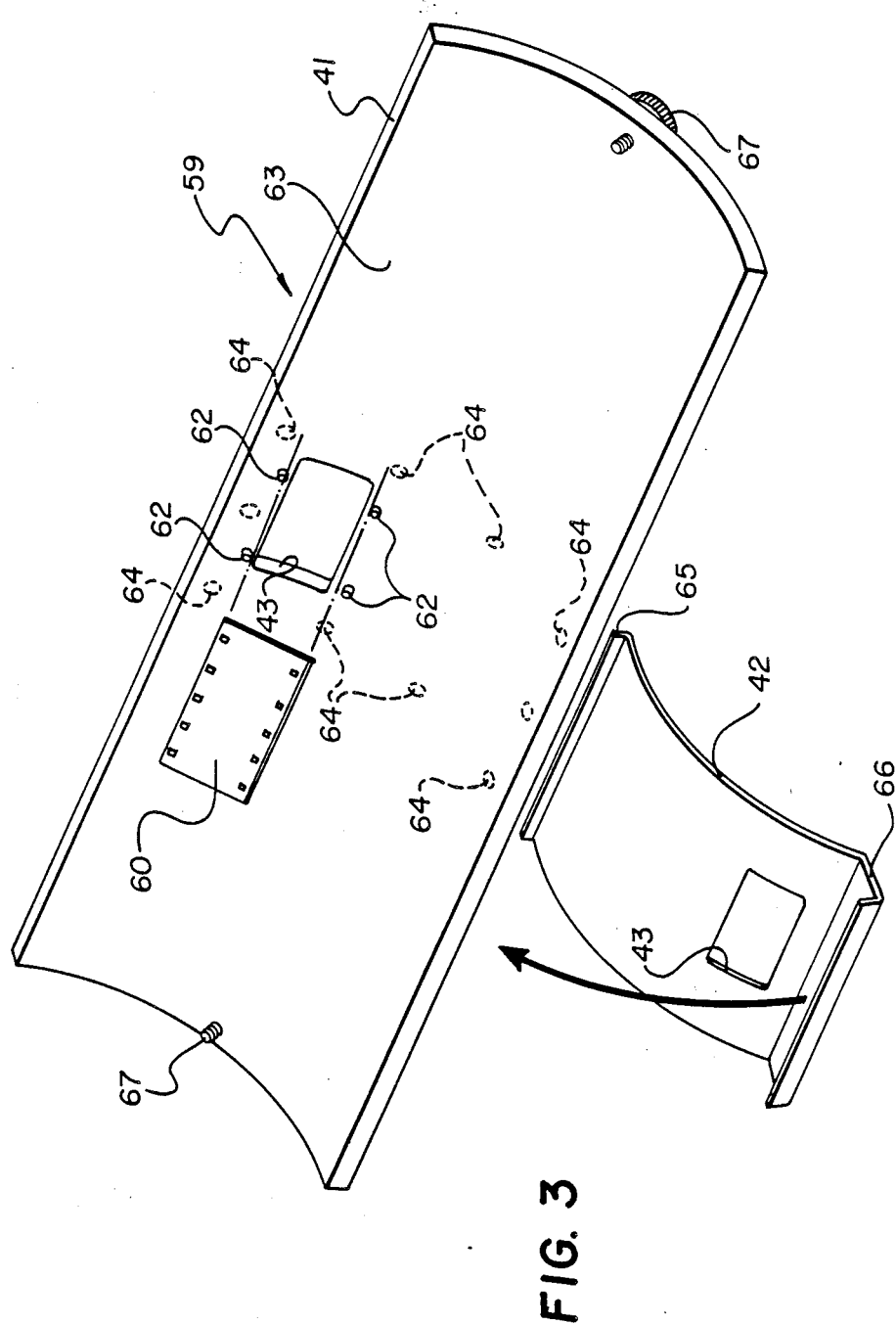
FIG. 3 is a perspective view showing, in an open film-receiving position, an alternate preferred embodiment of a mechanism for mounting film on scanner apparatus of the drum type.

FIG. 3 shows an alternate presently preferred embodiment of a film-mounting mechanism 59 in accordance with the invention. Elements of the mechanism 59 of FIG. 3 that are functionally identical to, or equivalent to, elements of the film-mounting mechanism 40 of FIG. 2 are identified by common numbers.

The film-mounting mechanism 59 comprises a pair of rigid arcuate members 41, 42 each of which has both a natural curvature corresponding to the curvature of the surface 13 of the drum 11 and an aperture 43 corresponding to the size of a film image to be scanned. Film 60 to be scanned is sandwiched between the members 41, 42 with the film image aligned with each aperture 43. To that end, a series of strategically placed spring-biased pins 62, protruding from the inwardly facing surface 63 of the member 41, serves advantageously for precisely positioning the film image with respect to the aperture 43 of the member 41.

The opposite surface of the member 41, the outwardly facing surface, carries a series of magnets 64, shown in phantom, which function to magnetically clamp the members 41, 42 together, with film sandwiched therebetween. To that end, the magnets 64 are arranged on the member 41 in a pattern corresponding to the perimeter of the member 42. The member 41 is preferably made of die-cast aluminum, whereas the member 42 is formed from a sheet of steel.

A flange 65, at one end of the member 42, serves as a catch for locating the member 42 longitudinally with respect to the member 41. An extension 66, integral with the opposite end of the member 42, functions as a handle for separating the member 42 from the member 41.

Figure 4:
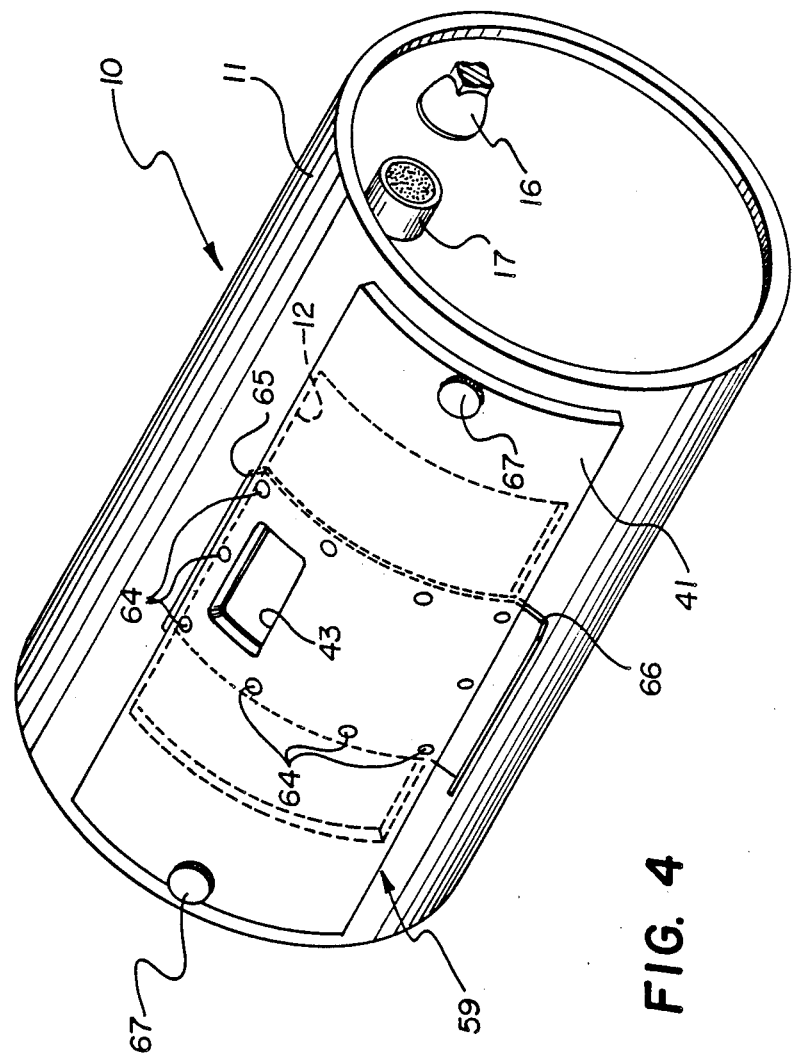
FIG. 4 shows the mechanism of FIG. 3 mounted on the drum of FIG. 1.

FIG. 4 shows the mechanism 59 in a closed film-receiving position secured to the drum 11 of image scanner apparatus 10. For that purpose, a pair of screws 67, threadably mounted at opposite ends of the member 41, serve to attach the mechanism 59 to the drum 11 for rotation therewith.

The invention has been described in detail with reference to the figures; however, it will be appreciated that variations and modifications are possible within the spirit and scope of the invention.

What is claimed is:

1. In image scanner apparatus of the drum type, wherein the improvement comprises a mechanism for mounting a flexible image-bearing film immediately adjacent said drum, in a curved plane substantially parallel with the curved surface of said drum and in registration with an aperture on said curved surface of said drum such that the film image to be scanned is free of drum support.

2. Image scanner apparatus as defined in claim 1 wherein said mechanism mounts film in a curved plane adjacent the outwardly facing side of said curved drum surface.

3. Image scanner apparatus as defined in claim 1 wherein said mechanism includes an opposed pair of first and second members each of which has an interior aperture the dimensions of which are smaller than the corresponding dimensions of the film, said first and second members being arranged facing each other to sandwich a border of the film therebetween with the film image to be scanned aligned with each interior aperture.

4. Image scanner apparatus as defined in claim 3 wherein said first and second members are rectangular flexible sheets and wherein said mechanism further includes a panel securing said first and second flexible sheets together along a corresponding peripheral edge of each rectangle, to provide a clamshell effect for loading film between said sheets from a corresponding end of each rectangle opposite said panel.

5. Image scanner apparatus as defined in claim 4 wherein said drum is rotatable, and said mechanism further includes means for securing said panel to said curved surface of said drum for rotation therewith.

6. Image scanner apparatus as defined in claim 5 wherein said mechanism further includes resilient means for biasing the end of each rectangular sheet opposite said panel against said curved surface of said drum, to secure each of said flexible sheets in a curved plane on the outwardly facing side of said curved drum surface.

7. Image scanner apparatus as defined in claim 3 wherein said first member and said second member are rigid and of arcuate shape, each member having a natural curvature corresponding to the curvature of said curved drum surface.

8. Image scanner apparatus as defined in claim 7 wherein both members are held together facing each other by a magnetic clamping force when film is sandwiched therebetween to be scanned.

9. Image scanner apparatus as defined in claim 8 wherein one of said rigid members is made of aluminum and carries a magnetic device, and the other of said rigid member is formed from sheet steel.

10. Image scanner apparatus as defined in claim 7 wherein at least one of said members carries a spring-biased positioning means for aligning the film image to be scanned with the corresponding interior aperture of each rigid member.

* * * * *